United States Patent

Dyregrov

[11] 4,341,466
[45] Jul. 27, 1982

[54] METHOD AND APPARATUS FOR DISPLAYING THREE COORDINATES OF AN OBJECT IN A TWO DIMENSIONAL PLANE

[76] Inventor: David L. Dyregrov, P.O. Box 255, Waterford, Va. 22190

[21] Appl. No.: 161,361

[22] Filed: Jun. 20, 1980

[51] Int. Cl.³ .................... G03B 27/48; G03B 27/50
[52] U.S. Cl. .................... 355/50; 354/110; 355/77
[58] Field of Search .................... 33/20 D; 354/110; 355/77, 50, 40; 356/2, 72; 250/220 SP

[56] References Cited

U.S. PATENT DOCUMENTS

| | | |
|---|---|---|
| 730,916 | 6/1903 | Holmes . |
| 1,558,585 | 10/1925 | Boykow . |
| 2,307,646 | 1/1943 | Sonne . |
| 2,352,176 | 6/1944 | Bogopolsky . |
| 2,639,653 | 5/1953 | Fischer . |
| 2,651,233 | 9/1953 | Tondreau, et al. . |
| 2,759,814 | 8/1956 | Kegeles . |
| 2,912,761 | 11/1959 | Woodward et al. . |
| 2,933,008 | 4/1960 | Barnett . |
| 3,135,184 | 6/1964 | Siebenberg . |
| 3,288,018 | 11/1966 | Belchis et al. . |
| 3,296,920 | 1/1967 | Goldfischer . |
| 3,316,348 | 4/1967 | Hufnagel et al. . |
| 3,578,863 | 5/1971 | Farrand . |
| 3,650,626 | 3/1972 | Hofmann . |
| 3,667,831 | 6/1972 | Pennington et al. . |
| 3,857,052 | 12/1974 | Beller . |

OTHER PUBLICATIONS

"Spectra-Physics, Model 124B, 15mW Helium-Neon Laser", 8/79.

*Primary Examiner*—Richard A. Wintercorn
*Attorney, Agent, or Firm*—Pollock, Vande Sande & Priddy

[57] ABSTRACT

Apparatus and method are described for providing a display of objects in a plane wherein two dimensions of the objects are represented by the coordinates of the images representing the objects, and a third dimension such as the distance of an object from a reference plane and from other objects is represented by the contrast of the image. Apparatus for determining the angular coordinates of an object from a reference plane is described which permits the calculation of the distance from the reference plane to the object. Distances to the object may be ascertained by passive methods which illuminate the object with natural light or by active methods which illuminate the object with a laser.

16 Claims, 9 Drawing Figures

METHOD AND APPARATUS FOR DISPLAYING THREE COORDINATES OF AN OBJECT IN A TWO DIMENSIONAL PLANE

BACKGROUND OF THE INVENTION

The present invention relates to apparatus and method for displaying on a two dimensional plane three coordinates of an object in a field of view. More specifically, a method and apparatus are provided for generating images of objects in a field of view, the images having a brightness associated therewith corresponding to the relative distances from a reference point of objects represented by the images.

Prior art methods of representing a scene, such as color or black-and-white photographs, infra-red or radar pictures, yield a picture in two dimensions from which two coordinates of any point in the scene can be accurately determined. However, the distance to an object in the scene and the distances of the objects from each other in depth must be inferred by various distance clues based on the experience of the human viewer. The accuracy of this method of distance determination is highly variable, depending, as it does, on the experience and ability of the individual, the distance clues available, the clues utilized and other factors. Nevertheless, while a computer could determine the two above-mentioned planar coordinates with accuracy as great as or greater than a human, it would be extremely difficult for it to make any determination whatsoever of the distance of an object from the viewpoint, or the distances between objects in depth.

SUMMARY OF THE INVENTION

It is an object of this invention to provide a display of objects which conveys the two usual coordinates of the object points, as well as a third distance coordinate.

It is a further object of this invention to provide apparatus and methods for producing images in a two dimensional plane which convey information concerning the relative distances of objects represented by the images from each other and from a reference point.

These and other objects are accomplished by apparatus and methods according to the present invention. A visual display for indicating the relative position of objects in a three dimensional field is produced on a planar surface; each point on the surfaces of the objects in the scene is represented solely by its position on the planar image surface, while its distance from a reference point is represented by its brightness. Shadow, color, texture and other elements of scenes in their usual planar representations made by ordinary photographic methods are not present in a display according to the present invention as they would interfere with the representation of distance as a function of the brightness of the image.

In one embodiment of apparatus and method according to the invention, angular coordinates of all object points from a reference point are determined from the natural illumination of the objects. A first image of the scene is formed on an image plane through an optical slit in a reference plane and a lens, and a second image in the image plane is formed of said scene through the same slit and lens and through a cylindrical filter surface disposed over the slit. The cylindrical filter surface has an axis coincident with the slit, the density of this filter surface being made to vary with respect to the distance along the circumference of the cylinder surface. Images produced by method and apparatus according to this embodiment may be scanned with well-known image intensity measuring devices to accurately determine the relative brightness between objects represented in the visual display, thereby determining an angular coordinate of the object from a reference point. By measuring the intensity of first and second images for each object point, a density is determined which corresponds to a specific line along the cylindrical filter surface. The angle, with its vertex at the slit, which this line makes with the plane in which the slit lies thereby determines one angular coordinate of the object point. A second angular coordinate is determined by a second set of images formed in an identical manner through a second slit adjacent to the first slit in the reference plane. Thus, two coordinates are determined for specifying the location of an object from the reference plane. With these angles and the distance between the slits known, the distance to the object point can be determined.

In another embodiment of the present invention, objects in a scene are illuminated by successive lines of a laser beam, the laser beam being scanned in a plurality of rasters. An image is made of the scene while the objects are being scanned. For objects which are further away from the reference plane, the images of the laser lines striking the objects appear to be narrower. The relative height of the illumination lines on images of the objects scanned in a given scene determines the relative distance of these objects.

Processing of images produced by these and other methods permits a display to be made so that the brightness of the image points representing object points varies depending on the relative distance of the object points from the given reference point.

These and other embodiments of the invention are described more particularly in the description which follow.

DESCRIPTION OF THE PREFERRED EMBODIMENTS

Figure 1:
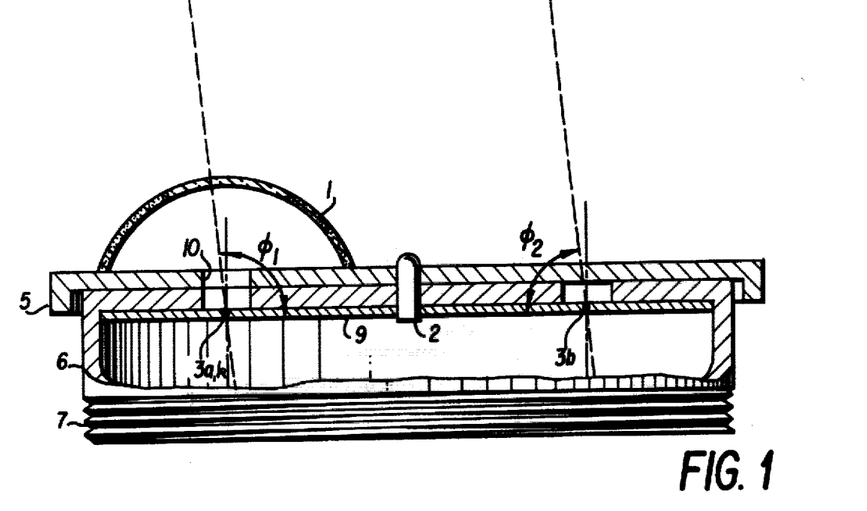
FIG. 1 is a top view of apparatus useful for forming images in accordance with one embodiment of this invention.
Figure 2:
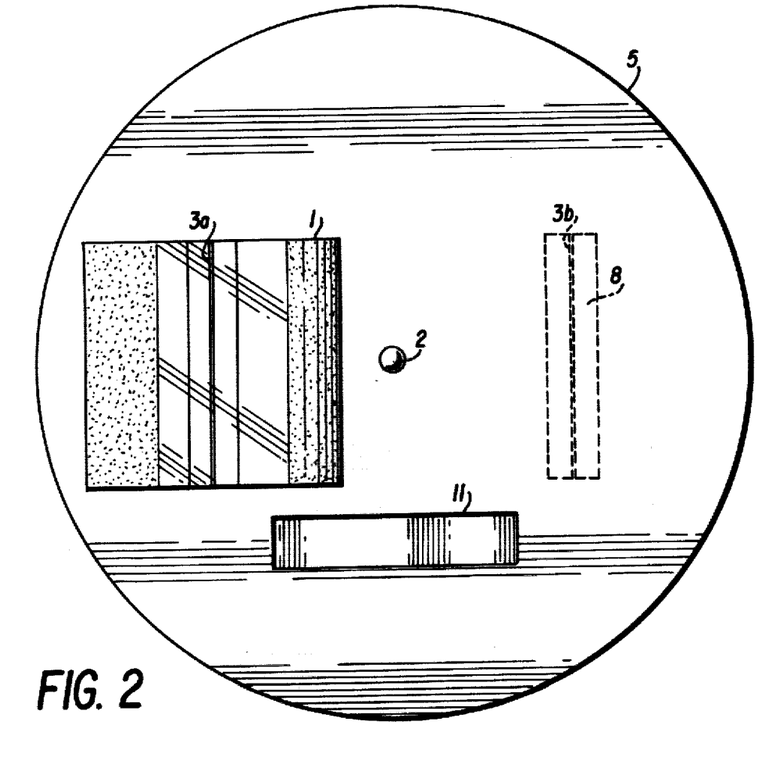
FIG. 2 is a front view of the apparatus of FIG. 1.

Referring now to FIG. 1, there is shown apparatus capable of forming images on a photosensitive surface which may be used to establish first and second coordinates of an object located a distance from a reference plane. The apparatus shown in the figure is capable of being mounted to a camera lens hood by means of thread 7 located on a mounting ring 6. The aperture plate 9 and mounting ring 6 form an enclosure over the camera lens which is open to receive light from the naturally illuminated object 0 through first and second slits 3a and 3b located within the aperture plate 9. In an embodiment of this method and apparatus, there are provided slits of a width of 0.02 inches to permit light incident thereto to enter and be imaged on a photographic surface within a camera. As an alternative to optical slits, pinholes may be incorporated. Thus, when in place, the apparatus of FIG. 1 provides for an image incident to the lens of a standard black and white NTSC television camera or photographic camera from a naturally illuminated object 0 located on the opposite side of the aperture plate 9.

Light entering slits 3a and 3b is controlled through use of a table 5 which is rotatably mounted to mounting ring 6 and the aperture plate 9 through a pivot point 2. Table 5 contains a larger opening 10 in the form of a wider slit which may be positioned into coincidence with the axis of either of slits 3a and 3b by rotating table 5 180°. A second opening 11 is provided in the table 5 at 90° to the first opening 10 and on a radius whereby the opening 11 is also placed into coincidence with the axis of slits 3a and 3b upon rotation of table 5.

Opening 10 is covered by a semi-cylindrical filter 1 having an optical axis 1a coincident with the axis of either slit 3a or 3b, depending upon the position of opening 10. The filter comprises a continuously variable neutral density filter having a predetermined density which varies linearly with the distance along the circumference of the cylindrical surface. In a preferred embodiment of the apparatus of FIG. 1, the semicylindrical surface is made of plate glass having a thickness of approximately 0.16 centimeters covered with a deposit of inconel. The range of density of the filter varies from approximately 0.02 representing 96% transmittance to 2 representing 1% transmittance, the density of the filter increasing in the direction away from the optical axis of the camera lens along the circumference of the cylinder. The density characteristics of the filter must be previously determined by careful calibration so that the point at which an incident ray enters the filter material may be detected by comparing the relative intensity produced by a ray through the filter matieral with the relative intensity of an identical ray passing through the slit with the filter removed.

With the apparatus of FIG. 1, a standard television camera is coupled to mounting ring 6. The lens on the camera should be selected to have a wide diameter to increase the parallax of a resulting image; however, the use of the extreme edges of the lens should be avoided since the rays received therethrough do not result in a sharp focus. The focal length of the camera lens should be set to provide as sharp an image as is possible for all objects in the scene to be photographed. In the event that the farthest object and closest object have known distances, the lens may be set at 2nf/n+f, where n is the closest distance and f is the farthest distance of known objects to be imaged.

The apparatus of FIG. 1 is used according to the following procedure. Opening 11 is positioned over a first slit, for instance 3a. The camera permits a triangular sheet of rays emanating from naturally illuminated object 0 to enter the slit 3a and form an image on a photosensitive surface in the camera. The luminance level produced from this image is stored for later analysis. A second image is produced of naturally illuminated object 0 through the neutral density filter 1 and slit 3a in registry with the previously produced image.

The formed images are located at the same x, y, coordinates in the television camera image plane; however, the intensity of the images thus formed will be different due to the presence of the neutral density filter 1. The neutral density filter 1, as has been previously noted, has a density which is a function of the angle which the triangular sheet of rays incident to the filter 1 and passing through the slit 3a or 3b makes with the plane of the slit.

The two images formed are related in intensity to the density of that portion of filter 1 which receives the incident ray from the illuminated object 0 as follows:

$$\text{density} = \log_{10} \frac{\text{intensity of first image}}{\text{intensity of second image}}$$

Since the above relationship correlating the angular position of an incident ray to the density of the filter material 1 is previously known, angle $\phi$ representing the coordinate of the incident ray may be solved for by computer techniques known to those skilled in the art by considering the intensity of images formed with and without the semicylindrical filter. With angle $\phi$ thus determined, one coordinate of the illuminated object 0 with respect to the slit 3a and base 9 is thereby determined.

The same procedure is followed with respect to slit 3b. Two images are formed through slit 3b, one through opening 10 with the filter 1 in place and the other through opening 11 without the filter. The resulting intensities of the images formed thereby establish a second coordinate $\phi_2$ which locates the angular position of illuminated object 0 with respect to slit 3b. Thus, knowing the distance between slits 3a and 3b as well as the angular coordinates $\phi_1$ and $\phi_2$, those skilled in the art will recognize the solution for the distance from 0 to the aperture plate 9 to be readily ascertainable.

The outputs of the television camera can be measured, and the relative intensity produced by images formed with and without the filter may be determined by measuring the respective luminance produced from imaging each of first and second images formed by the apparatus of FIG. 1. Further, electronic circuitry could be implemented by those skilled in the art which would utilize the intensity of the image formed without the filter and that formed with the filter to determine the density of the filter. In the same way, $\phi_1\phi_2$ could be determined and the distance between the slits being known, the distance to 0 can be determined.

An alternative to using a television camera requires the production of photographs formed through slits 3a and 3b. The lens hood 7 is coupled directly to a photographic camera and first and second photographs are taken through slit 3a with and without the filter 1. The two images are then sequentially read by a flying spot scanner known to those skilled in the art. The flying spot scanner is used with a computer to determine the density of an image on the photographs. In the absence of an image or photograph, the flying spot scanner produces a current $I_0$ which is stored in the computer as the current produced from the scanning spot. Next, the image formed through a slit without the cylindrical filter 1 is scanned and the current $I_1$ is produced. The transmittance for the device forming the first photograph is thereby calculated as:

$$T_1 = I_1/I_0$$

The density of this transmittance may then be calculated as:

$$D_1 = \log_{10}(1/T_1)$$

Stored in the computer is a characteristic curve of the log exposure of the film versus the density of the image produced thereon. The corresponding log exposure for $D_1$ is represented by:

$$Le_1$$

Next, the transmittance of the image formed through the filter 1 and the slit is determined by the flying spot scanner as:

$$T_2 = I_2/I_0$$

$$D_2 = \log_{10}(1/T_2)$$

The corresponding log exposure for this density $D_2$ is found by the look up table in the computer as:

$$Le_2$$

With the log exposure of each image formed on the respective photographs, the filter density can be determined as:

$$D_f = \log_{10} \text{opacity}$$

$$\log_{10} \text{opacity} = \log_{10}(Le_1) - \log_{10}(Le_2)$$

By the above equation, utilizing the relative log exposure determined from the two photographs, the computer can determine the density of the filter along the density line struck by the triangular sheet of rays coming from the object. As was previously noted, this density is associated with a unique angle $\phi_1$ which the incident rays make with the surface containing the slit. Thus, the required angular coordinate is determined.

The second angular coordinate $\phi_2$ can be similarly determined from two photographs taken through a second slit 3b with and without filtering. The photographs are taken with the same type of film having the same log exposure characteristics. A professional black and white film such as Kodak Plus X PAN Professional Film is recommended. With the second angular coordinate $\phi_2$ determined, the distance to the object may be calculated knowing the distance between slits.

As a means for displaying the respective distances of all the objects in the scene utilizing the filter attachment with either a television or photographic camera, it is of course possible for a computer equipped with a display to graphically simulate the XY coordinates of images produced as well as varying the intensity of these images to reflect the relative distances from aperture plate 9.

It can be seen that the apparatus of FIG. 1 will provide for the determination of a third coordinate of an object. Thus, with the information derived from images produced by the apparatus of FIG. 1, it is possible to construct an image having three coordinates, the first two representing the position of the image on a plane, as on an ordinary photograph. The third coordinate, relating to the distance of an object from a reference plane, can be represented by altering the contrast of an image representing the object.

Figures 3, 4, 5, 6:
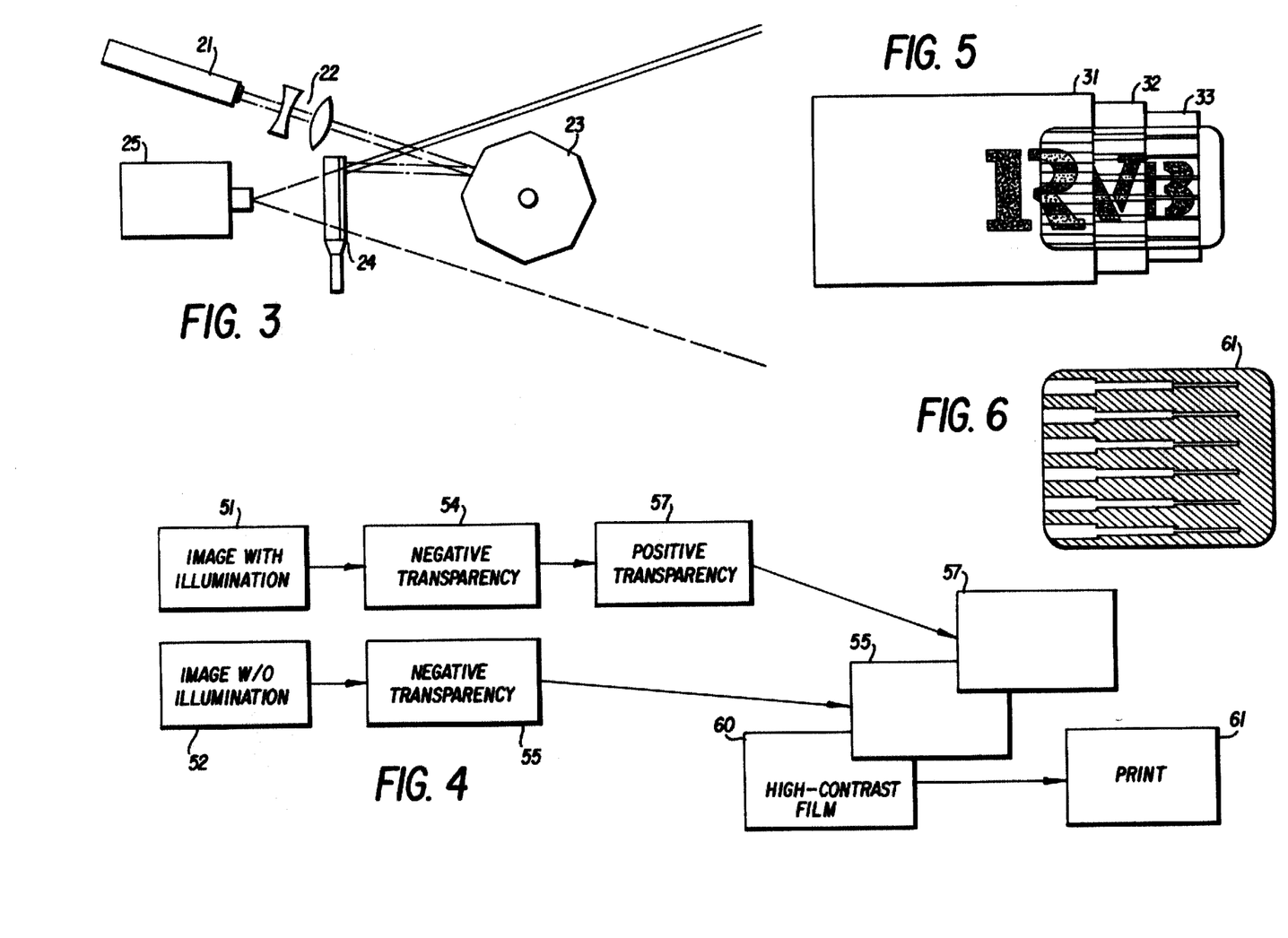
FIG. 3 is a top view of an apparatus used to illuminate object points whose distances from a reference point are to be determined.
FIG. 4 illustrates a process of making a display of distant objects which indicates a third dimension of said objects.
FIG. 5 illustrates objects being illuminated by the apparatus of FIG. 3.
FIG. 6 is the resultant display of the scene of FIG. 5 produced by the processing of FIG. 4.

In the preferred embodiment of the invention, images are produced by artificial illumination of objects, and the relative distance of the illuminated objects from a reference plane is established. Apparatus for providing such illumination is shown in FIG. 3. FIG. 3 illustrates a laser raster scanner for providing raster lines of collimated laser energy. The laser energy is positioned on distant objects such as those shown in FIG. 5 and a series of horizontal scan lines is painted on the objects in the scene, the more distant objects appearing to have narrower raster lines than the closer objects due to the inverse square law of optics. The scanning laser beam is derived from a helium neon-type laser 21 having a wavelength of 6328 angstroms and a beam diameter of about approximately 1.1 mm. Beam divergence is held to be approximately 0.75 mrad. Such lasers are well-known to those skilled in the art and may be obtained from such well-known manufacturers as Spectra Physics, Inc., Mountain View, Calif. A collimator for the laser beam is represented by negative and positive lenses 22 shown in FIG. 3. Scanning of the laser beam is accomplished by a horizontal scanner 23 comprising a plurality of polygon faces for deflecting the beam. The horizontal sweep frequency of the beam is advantageously selected to be approximately 15,750 Hz with a scan angle of approximately 25°. The number of polygon faces is 30, and a rotational speed of 31,500 rpm is necessary to scan the beam as required. Vertical deflection of the beam is accomplished by a vertical scanner 24 which may be a d'arsonval galvanometer such as is manufactured by Brush Instruments. Scanning the beam in the vertical direction occurs at a 30 Hz rate. The apparatus thus described for scanning the distant objects whose distance shall be displayed on a two dimensional display is therefore seen to be conventional and within the knowledge of those practicing in the art.

The system requires taking pictures with a camera 25 which will have film sensitivity sufficient to detect a difference in brightness when the object is being photographed with laser light incident thereto as compared to being photographed wihout artificial illumination. During the interval that a laser is painting a raster on the objects being photographed, 31, 32 and 33 of FIG. 5, the camera 25 has its shutter open. The scan of one complete raster occurs in one thirtieth of a second. Once this picture is taken, the camera takes a second similar picture of the objects without laser illumination and a second negative is obtained. Although it is contemplated to scan 525 lines, only 6 are shown for illustration purposes.

Referring to FIG. 6, there is shown a print of the image produced from illuminating the distant objects 31, 32 and 33 in different planes which have on their surfaces the letters R, V and B respectively. The picture taken with laser illumination indicates that wider i.e., higher raster lines are produced on the images of the closer objects than on the images of objects which are farther from the camera. The camera 25 is positioned such that the apparent source of the laser scanning is substantially the same as the optical axis at the camera lens. In this way, the scanned lines do not suffer distortion to any large degree if they strike an irregular surface or any surface which is not normal to the beam. It is therefore seen that a closer object is represented in the print by lines of illumination having a height greater than the lines of the image representing a more distant object. Therefore, the brightness of each image is indicative of the relative distance of objects described by the image from each other and from the plane of the illuminating source 21.

FIG. 4 illustrates a technique for manufacturing a print from the two pictures taken of the objects; one during illumination by the laser beam and the other without illumination. The resulting print shows the closer objects as brighter than the more distant objects. The image 51 resulting from the taking of a picture with camera 25 when objects 31, 32 and 33 were illuminated by the laser beam is used to provide a positive transparency 57 from a negative 54. A negative 55 is made from the image 52 taken of objects 31, 32 and 33 without illumination by the laser beam. The density and contrast of the areas of the positive transparency which represent parts of the scene which were not touched by the laser beam should be as close as possible to those of the respective areas of the negative taken when the laser was not on. A sandwich is formed with the positive transparency 57 on top, the negative 55 next, and high-contrast black-and-white film 60 on the bottom. When the package is exposed, by placing it into a printing frame with the high contrast film receiving light from an exposing light through positive transparency 57 and negative 55, the portions of the sandwich which represent areas of the scene untouched by the laser beam are of equal opacity and transmit no light or almost none. However, those areas of the objects in the image which were subject to illumination by the laser beam will permit some light to pass through the sandwich onto the high-contrast film. The high-contrast film 60 is exposed until all areas of the film representing parts of the scene which were struck by the laser beam are darkened to the same intensity. The remaining areas remain unexposed.

The negative 60 can be printed to provide a print 61, shown in FIG. 6, comprising alternate white stripes upon a black background. The centers of the white stripes, corresponding to the illuminated portions of the objects in a scene will be equidistant from each other. The stripes will have, as was noted with reference to FIG. 5, a different height depending upon the distance of the objects 31, 32 and 33 from the source of laser illumination. When viewing at a proper distance, the human eye will not be able to determine that the lines alternate between illuminated and dark portions, but rather will see shades of grey in the manner familiar from black-and-white television screens and half-tone prints. This shade of grey is a function of the distance from the object being photographed to the camera aperture. Images of objects closer to the camera will be lighter than images of objects farther away from the camera.

Therefore this process produces a planar representation of a scene wherein the images have a contrast which varies with the distances of the respective objects represented by the images from each other and from the camera aperture. With the printing process thus described, all the usual information about objects in the scene, such as color, reflectivity, shadow, and texture is eliminated, and the brightness of an image point will be a function solely of the distance of the object point which it represents.

The underlying principle of the above method is that, while the laser beam remains a pencil of parallel light as it moves away from its apparent source at the camera aperture, the space in which it is seated, bounded above and below by imaginary lines, widens with increasing distance from this viewpoint according to the inverse square law of optics. From the point of view of an observer or camera at this viewpoint, the apparent size of the laser beam decreases with distance, while the apparent size of the space in which it is seated remains the same. Hence, the representation of any point of the scene consists of the apparent size of the laser beam at the distance of the object the beam strikes, centered in a dark rectangle. Thus, the ratio of (light) laser image to (dark) background rectangle decreases with distance. Since the rectangle with its embedded laser image is viewed at a distance beyond the ability of the eye to resolve the two, it is seen as a shade of grey. Therefore, each point in the image is seen as a shade of grey representing the distance of the original object from the viewpoint. Although a laser source having a non-diverging collimated pencil of light is disclosed, a perfect condition of parallel light is not required; a diverging or converging beam can be utilized. If the maximum range to be encountered for the most distant object lies no farther than the distance at which the beam comes to a focus, the beam can converge. Otherwise, for an object at a greater distance than the focal point, the beam would again diverge and the results would be ambiguous, i.e., there would be two distance values for a given apparent height of the beam. If a diverging beam is used to illuminate the objects to be the subject of an image, the angle of divergence must be smaller than the angle of divergence of the space in which it is seated, as seen from the camera aperture.

The minimum effective range of the apparatus of FIG. 3 is a distance R from the viewpoint to an object in which there would be no space between the laser beam line images in the raster if a plane normal to the beam striking the center of the raster were placed at a distance R to intercept them. The maximum effective range for a device utilizing a theoretically non-diverging laser beam would be at the distance at which the returning image of the beam is too small to be discerned or the beam is never intercepted, such as might happen in the atmosphere or in space.

Figure 7:
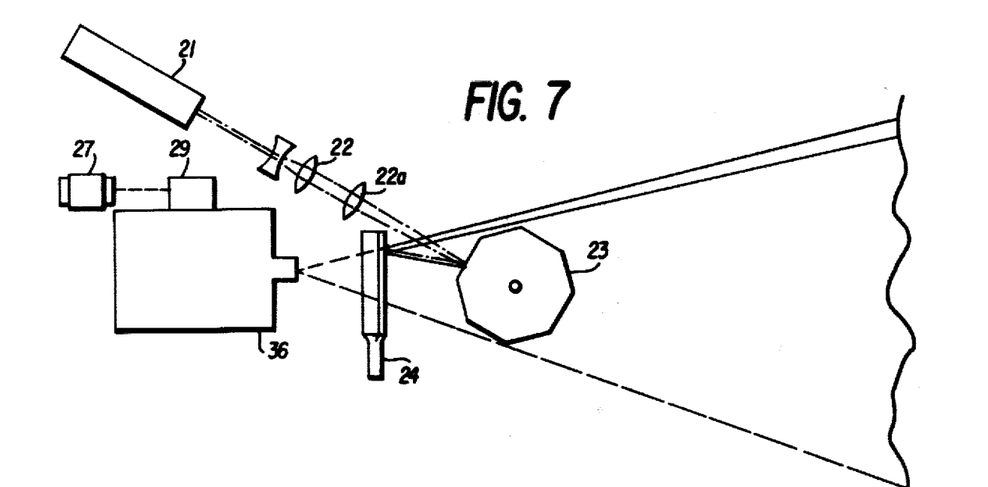
FIG. 7 is a top view of yet another embodiment of apparatus for illuminating object points whose distances from a reference point are to be determined.
Figure 8:
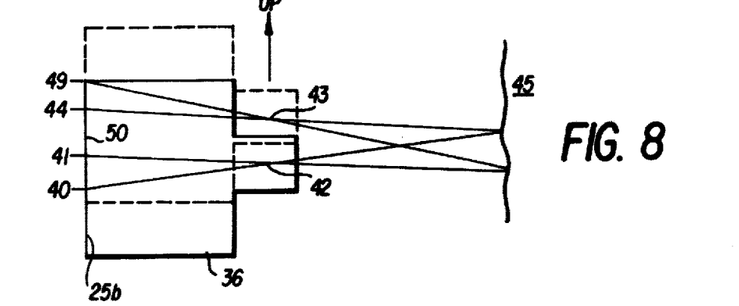
FIG. 8 illustrates the operation of the apparatus of FIG. 7 when a relatively close object is being photographed.
Figure 9:
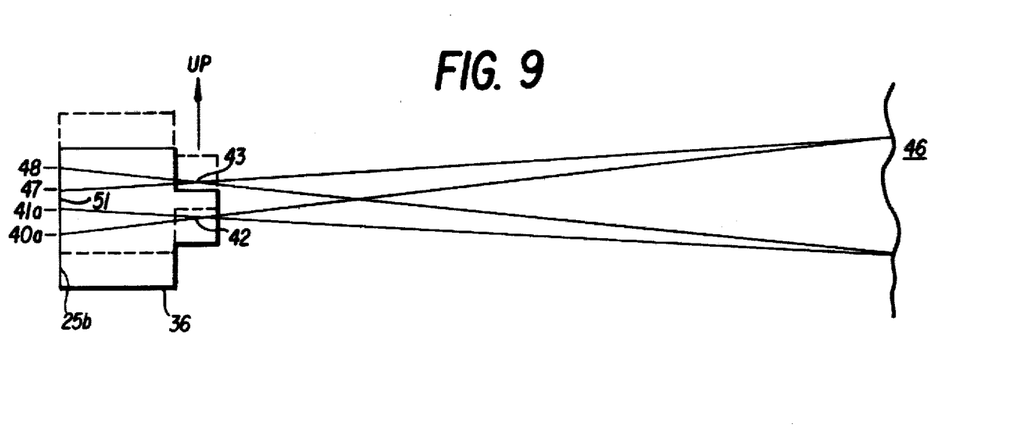
FIG. 9 illustrates the operation of the apparatus of FIG. 7 when a more distant object is being photographed.

FIGS. 7, 8 and 9 illustrate yet another embodiment of the present invention.

Camera 36 is located so as to appear to be at the source of the illuminating light beam, as was the case with the previous embodiment. The embodiment of FIG. 7, however, differs in that the camera 36 is mounted to a rail 29 for vertical movement by means of a motor 27. The motor 27 will permit motion of the camera 36 in a single vertical plane during exposure of a film. Also, the second positive lens 22a brings the laser beam to a focus so that it thereafter diverges slightly. As was the case in the previous embodiment, this system can operate in total darkness or in ambient light so long as the camera can record a difference between the brightness of a part of the scene the laser touches when it is turned on and the brightness of the same part when the laser beam is absent. While scanning several rasters of the laser beam onto objects within a scene, the shutter is open. During this interval, as the black-and-white film in the camera 36 is being exposed, the camera is moved vertically a short distance at a contant rate of speed by the motor means 27 along a rail 29. Another film is exposed immediately before or after, in the same way as the one just described except that the laser 21 is disabled during the exposure.

Referring to FIG. 8, the effective movement of the camera 36 may be seen on the image formed therein. The camera lens 42 (or 43), represented in the diagram by a pinhole, permits rays from the illuminated objects to strike the photosensitive surface 25b at the rear of the camera 36. 42 illustrates the pinhole defining the opening in the camera prior to commencing motion of the camera in a vertical direction, and 43 indicates the position of the opening of the camera at the end of the vertical period.

It can be seen that the resulting image of the laser beam formed on the rear side of the camera on photosensitive material 25b is smeared. At the initial opening of the shutter of camera 36, the image of a laser line on an object 45 occupies space between points 40 and 41 on the surface of the photosensitive film material. At the conclusion of the vertical movement of the camera 36, the image has moved from the first location defined by 40 and 41 to a second location defined by points 44 and 49. Since the film is moving with the camera motion, the final extent of the smeared image is from 50 to 49. The resulting smeared image is considerably longer than the original image of the laser beam striking an object prior to motion of the camera.

Referring now to FIG. 9, an image produced from a more distant object 46 can be observed. The image formed at the beginning of camera 36 motion is confined between points 40a and 41a, and during motion moves up to 47 and 48. Thus, there is a smeared portion 51 to 48 produced as in the case of the closer object. However, the smeared image is narrower in height. The reason for the distinct differences in image formation resulting from distant objects as compared with closer objects is that the monocular parallax of motion is less for a distant object. It will be seen that the original lengths of the image for both the close and the more distant objects are the same, i.e., from 40 to 41, and from 40a to 41a. This results because the rays entering the camera are made by the same laser beam which has its apparent origin at the same point 42, which is the pinhole which represents the lens in camera 36. Since the beam diverges, it expands as the inverse square of the distance. Because the camera is at the apparent origin of the beam, the image spot is always the same length no matter what the distance of the object. Even if the surfaces struck were irregular or slanted, the camera would always record a spot of the same length.

In the embodiments of FIG. 7, the laser scans 525 parallel lines in a given frame. The image formed of objects illuminated by the laser beam contains the visible lines illuminating the objects. As the laser image also smears upward on the film, it smears into areas of the image representing nonilluminated portions of the object. If the object being illuminated is a plane at the minimum possible range, it will be apparent that the top of the laser images will be smeared up to the bottom of the next adjacent laser images, whereby no portion of the resulting image will be free of the laser beam image. Conversely, if an object being photographed is far enough away from the camera, there will appear to be no smearing whatsoever. Therefore, it can be seen that the length or, more accurately, the height of the smear is an inverse function of the distance of the object.

The two negatives produced above can be processed in accordance with the procedure shown in the previously described method relating to FIG. 4. From the photograph taken during the motion of the camera and the simultaneous scanning of several rasters by the laser, a positive transparency is made. Next, the illuminating source 21 is disabled and the object is photographed for an equal time interval while the camera 25 moves, as in the case of the illuminated condition. The resulting image 52 without laser illumination is made into a negative 55. The positive transparency 57 and the negative 55 are once again combined with a high-contrast film 60. The negative without laser illumination and positive with laser illumination are placed into registration with their bases together. A sheet of high-contrast film is added to make a sandwich. A print is made with the high-contrast film farthest from the exposing light. Those portions of the sandwich which represent areas of the scene untouched by the laser beam are of equal opacity and transmit no light or almost none. However, some light can pass through the portions which represent areas of the scene which were touched by the laser beam. The high-contrast film is exposed until all areas of the film representing parts of the scene which were struck by the laser beam are darkened to the same intensity. Remaining areas are unexposed. The negative produced 60 is now printed onto photographic paper. The resulting print 61 has images therein which have a brightness or intensity level proportional to the respective distances of the objects from the camera opening when viewed at the proper distance by a human.

Thus, there are described three separate embodiments of the present invention whereby a two dimensional surface can contain three coordinates of information concerning the object represented by the images. The images of objects retain the positions they would normally occupy in a planar representation such as a photograph, while the distances of the objects are represented by the intensity levels of the images. As a variant of the active methods described herein, it is possible to utilize laser radiation emitted in a short pulse. Apparatus for imaging such laser radiation is described more particularly in "Scene Imaging Using Laser Radiation", *Optical Spectra*, September 1968 (pp 25–29) hereby incorporated by reference. The return pulse from the object thus illuminated can be gated in at a desired time corresponding to a desired range of objects to be illuminated, and the resulting picture of this desired range stored in a computer. Subsequent illumination of objects in a scene can be accomplished by a different gate signal representing still another range of objects to be processed. Thus, separate pictures of different planes within a scene can be produced. By using a computer, the coordinates thus obtained for each plane can be stored, combined, and displayed in a cathode ray tube display as first, second and subsequent planes of objects which were illuminated at the specific ranges set. The resulting display by the cathode ray tube can result in a picture resembling a contour map. The area between two adjacent contour lines representing any one plane at a certain range in the scene can be made a shade of grey which is in proportion to the distance of the plane in the scene from the device. Closer objects can be represented by lighter images and distant objects by darker images.

Thus, there have been described numerous embodiments of the invention described more particularly by the claims which follow.

What is claimed is:

1. A method for making a display of objects in a two dimensional plane, wherein a third dimension is represented by a change in contrast comprising:
   scanning said objects with a substantially collimated light beam whereby a plurality of raster lines are formed on said objects, and
   photographing said objects during the time said objects are being scanned whereby a photograph is produced of said objects with a plurality of raster lines appearing on each image representing each object in said photograph, at least one dimension of each image raster line being indicative of the relative distance between objects represented in said images.

2. A visual display of objects wherein the relative distance between each object and a reference point is indicated by the relative brightness of images representing said objects.

3. A visual display for displaying objects in a scene, wherein said objects have two orthogonal dimensions represented in said display by the horizontal and vertical distances in a plane, and the distances from each other in a third dimension represented by the intensity of each displayed object.

4. A visual display for indicating the relative position of objects in a three dimensional field comprising:
   a planar surface containing a representation of each object, the horizontal and vertical distance between representations indicating first and second coordinates of said objects in said field, and the relative brightness of representations of each object, indicating a third coordinate for said objects, varies as the distance from said objects to a reference point.

5. A method for manufacturing a visual display of objects contained in a three dimensional field, comprising:
   producing two dimensional images of said objects on a planar surface;
   altering the brightness intensity of each image to provide a contrast between images representing the relative distance between objects represented by the images.

6. A method for displaying objects in a three dimensional field comprising:
   forming two dimensional images of said object on a planar surface, said two dimensional images representing first and second dimensions of said three dimensional field, and
   varying the brightness of each of said two dimensional images according to the distance of each object represented thereby from said planar surface whereby said images have a contrast which is a function of the respective distances of the objects represented by said images from said planar surface.

7. A method of making a visual display of objects comprising:
   illuminating a portion of said objects by scanning said objects with a substantially collimated light beam;
   photographing said objects at substantially the apparent origin of said collimated light beam to produce a positive transparency of said illuminated objects;
   photographing said objects at the position of said apparent origin to produce a negative transparency without illuminating said objects,
   assembling said positive transparency and negative transparency in registry for printing; and
   printing said assembled positive and negative transparency on light sensitive film whereby a photographic image is produced displaying objects in a two dimensional plane, the contrast of images of said objects indicating the relative distance of said objects from said apparent origin of said beam.

8. The method of claim 7 wherein said negative transparency is adjacent said film during production of said photographic image.

9. The method of claim 8 wherein a high contrast light sensitive film is used during printing.

10. A method of making a visual display comprising:
    illuminating portions of objects to be displayed with a scanning, substantially collimated light beam; and
    forming an image of said objects near the apparent origin of said light beam, said images having brighter portions representing that portion of the objects receiving said collimated light beams, said brighter portions varying in size in accordance with the distance of said object represented by said image from said origin.

11. A method for making a visual display comprising:
    illuminating portions of objects to be displayed with a light beam;
    focusing an image of said objects through a lens onto a photosensitive surface at substantially the apparent origin of said light beam,
    moving said lens and photo sensitive surface in a linear direction at a substantially constant rate whereby the representation of each of said objects including those portions of said objects which have been illuminated is formed, said representation having a brightness which is a function of the distance of objects represented thereby from said origin.

12. An apparatus for making a visual display comprising:
    light scanning means for projecting light for illuminating portions of objects to be displayed;
    focusing means located at substantially the apparent origin of light projected from said scanning means for forming an image on a photosensitive surface;
    means for moving said photosensitive surface and focusing means at a substantially constant rate in a plane whereby representations of said objects appearing on said surface have a brighter portion representing said illuminated portions of said objects, the relative size of said brighter portions representing the distance of an object represented thereby from said origin.

13. An apparatus for making successive images of an object used to calculate the distance of said object from a reference plane comprising:
    first and second optical slits spaced a distance apart in an opaque surface for permitting light reflected from said object to pass through said surfaces;
    a rotatable table pivotally supported to said opaque surface, said table having first and second apertures rotatable into coincidence with said first and second optical slits, a filter medium supported on said table, over one of said apertures said filter medium and associated aperture being positionable over one or the other of said slits for permitting light from said object to enter into one or the other of said slits through said one aperture in said table; said filter medium having a surface with a density which continuously varies whereby light rays entering said slit have an intensity which is a function of the positions along said continuously variable filter surface at which said rays enter;
    means for imaging light through each of said slits on an image sensitive surface, whereby first and second representations of said object can be made through said slits through said filter medium, and third and fourth representations of said object can be taken through said remaining aperture and slits without said filter medium, the intensity of images formed in said representations contain information for determining the distance of said objects from said reference plane.

14. A method for providing angular coordinates of a reflective object from a reference plane comprising:

forming a first image of said object through an optical slit located at said reference plane, forming a second image of said object through a second optical slit in said reference plane;

forming a third image of said object through a filter medium and said first slit, said filter medium having a predetermined density which varies along it surface;

forming a fourth image of said object through said filter medium and said second slit; each of said images representing said object; determining the relative density of said first image with respect to the density of the said third image whereby the density of that portion of said filter receiving a light ray from said object through said first slit is determined, said density indicating the angular position of said object with respect to said slit and plane thereof, and determining the relative density of said second image with respect to said fourth image whereby the relative density of that portion of said filter receiving a light ray from said object through said second slit is determined, said density indicating the angular position of said object with respect to said second slit and plane thereof.

15. A method for providing angular coordinates of a reflective point from a reference plane, said coordinates specifying the position of said point from said plane comprising:

forming a first image of said reflective point on an image sensitive surface through a slit through said reference plane;

forming a second image of said reflective point through said slit in said image plane on a image sensitive surface, said slit having a cylindrical filter surface disposed over said slit, said cylindrical filter surface having an axis lying in the plane of said slit and coincident with said slit, the density of said filter surface varying in a predetermined manner along the circumference of said filter surface;

comparing the brightness of said first and second images whereby a filter density is obtained corresponding to a predetermined line on said cylindrical surface which makes a known angle with respect to said slit and opaque surface corresponding to an angular coordinate of said object.

16. Apparatus for forming images for determining the distance of an object from a reference point in a reference plane comprising:

an opaque planar surface having first and second optical slits, said planar surface having on one side thereof a cylindrical coupling section, said coupling section adapted to be coupled to the lens of a camera, said optical slits being formed symmetrically to the axis of said cylindrical section;

an opaque disc member mounted for rotation to the remaining side of said surface about said cylindrical section axis, said disc having first and second slits oriented 90° with respect to each other and into rotatable coincidence with either of said optical slits in said planar surface, whereby one of said optical slits is exposed and the other is obstructed; and a cylindrical filter disposed over one of said slits in said disc member, said filter having a surface density which varies as a function of distance around the circumference of said filter; whereby said disc may be rotated to permit image formation of said object through either of said optical slits without filtering or through either of said optical slits with filtering whereby four images may be produced having intensities for determining the angular coordinates of said object with respect to said reference point.

* * * * *